United States Patent
Felix

[19]

[11] Patent Number: 6,155,625
[45] Date of Patent: Dec. 5, 2000

[54] VEHICLE STORAGE SYSTEM

[76] Inventor: Mark D. Felix, 14725 W. 90th Ter., Lenexa, Kans. 66215

[21] Appl. No.: 08/951,246

[22] Filed: Oct. 16, 1997

[51] Int. Cl.[7] ..................................................... B60N 3/12
[52] U.S. Cl. ...................................... 296/37.14; 296/37.1
[58] Field of Search ............................... 296/37.1, 37.2, 296/37.3, 37.6, 37.14, 37.16, 76, 194; 180/68.5; 190/106

[56] References Cited

U.S. PATENT DOCUMENTS

| | | | |
|---|---|---|---|
| 2,126,579 | 8/1938 | Roethel | 16/347 |
| 2,470,314 | 5/1949 | Lim . | |
| 2,471,730 | 5/1949 | Doerr . | |
| 2,518,342 | 8/1950 | Lim . | |
| 2,671,935 | 3/1954 | Flues | 49/479.1 |
| 4,733,898 | 3/1988 | Williams | 296/37.6 |
| 4,951,991 | 8/1990 | Haigler . | |
| 4,993,088 | 2/1991 | Chudik . | |
| 5,061,002 | 10/1991 | Saso | 296/37.14 |
| 5,064,335 | 11/1991 | Bergeron et al. . | |
| 5,080,417 | 1/1992 | Kanai | 296/37.14 |
| 5,154,470 | 10/1992 | Bringman, Jr. . | |
| 5,172,519 | 12/1992 | Cooper | 296/37.1 |
| 5,228,737 | 7/1993 | Zimmerman | 296/76 |
| 5,293,951 | 3/1994 | Scott | 180/65.5 |
| 5,468,038 | 11/1995 | Sauri . | |
| 5,501,500 | 3/1996 | Cannon . | |
| 5,520,313 | 5/1996 | Toshihide | 296/37.12 |
| 5,533,771 | 7/1996 | Taylor et al. . | |
| 5,542,488 | 8/1996 | Nixon | 180/65.1 |
| 5,564,767 | 10/1996 | Strepek . | |
| 5,636,890 | 6/1997 | Cooper | 296/37.14 |

*Primary Examiner*—D. Glenn Dayoan
*Assistant Examiner*—Lori L. Coletta
*Attorney, Agent, or Firm*—Shughart, Thomson & Kilroy

[57] ABSTRACT

A vehicle storage system includes a walled compartment mounted on a vehicle bed below an opening formed in the vehicle bed. The opening is selectively covered by a lid assembly which is pivotally mounted on the vehicle bed for movement between open and closed positions. A latch assembly selectively secures the lid assembly in its closed position. A prop rod assembly selectively supports the lid assembly in its open position and folds out of the way to a storage position with the lid in its closed position.

6 Claims, 5 Drawing Sheets

VEHICLE STORAGE SYSTEM

BACKGROUND OF THE INVENTION

1. Field of the Invention

The present invention relates generally to storage compartments and in particular to a built-in storage compartment for a pickup truck bed.

2. Description of the Prior Art

Various types of storage compartments and enclosures have previously been devised for meeting the requirements of particular applications. For example, previous solutions to storage problems in vehicles include trunks, cargo beds, cargo areas, etc. Pickup trucks typically provide a relatively large open storage area for the vehicle size and are thus often the vehicle of choice for people who must haul considerable amounts of cargo. Hence, pickup trucks are relatively popular with construction workers, farmers and others who require vehicles with cargo carrying capabilities. However, a significant disadvantage to previous pickup trucks is that they provide relatively little storage space in a convenient location.

Various solutions have heretofore been proposed to compensate for insufficient storage space in pickup trucks. For example, spare tires are often mounted beneath the pickup truck beds, but this location can be difficult to access. Tool boxes are available for mounting transversely across the beds of pickup trucks for access from either side. Shells and caps are also available which form enclosures over the pickup truck beds. However, all of these solutions have disadvantages, which include expense, inconvenience and functional compromises.

Significant progress has been made in recent years in the development of electric vehicles. Placement of the electric storage batteries is an important factor in designing such vehicles.

The storage system of the present invention addresses the problems of storage and electric storage battery placement in pickup trucks, which tend to have relatively limited enclosed storage space. Heretofore there has not been available a vehicle storage system particularly suitable for pickup trucks with the advantages and features of the present invention.

SUMMARY OF THE INVENTION

In the practice of the present invention, a storage system is provided for a vehicle including a vehicle bed. An opening is formed in the vehicle bed and a compartment is mounted therebelow. A lid assembly includes a lid hingedly mounted on the bed for movement between an open position providing access to an interior of the compartment and a closed position closing the vehicle bed opening. A latch assembly selectively secures the lid in its closed position. A prop rod assembly includes a prop rod for supporting the lid in its open position. The prop rod folds out of the way to a storage position to permit closing the lid. The compartment interior can be used for storing various items, such as a spare tire or electric storage batteries for powering electric drive motor for the vehicle.

OBJECTS AND ADVANTAGES OF THE INVENTION

The principal objects and advantages of the present invention include: providing a storage system for a vehicle; providing such a storage system which is particularly adapted for mounting in a pickup truck bed; providing such a storage system which includes a compartment mounted below an opening formed in the vehicle bed; providing such a storage system which includes a lid assembly selectively covering the opening; providing such a storage system which provides relatively secure storage for a spare tire for the vehicle; providing such a storage system which provides storage for electric storage batteries; providing such a storage system which can be locked for securing the contents of the compartment; providing such a storage system which is easily accessible from the rear of the vehicle; providing such a storage system which does not intrude into the cargo space of the vehicle bed; providing such a storage system which is adaptable to a number of vehicles, including different models of pickup trucks; providing such a storage system which generally does not detract from the appearance of the vehicle; and providing such a storage system which is economical to manufacture, efficient in operation, capable of a long operating life and particularly well adapted for a proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
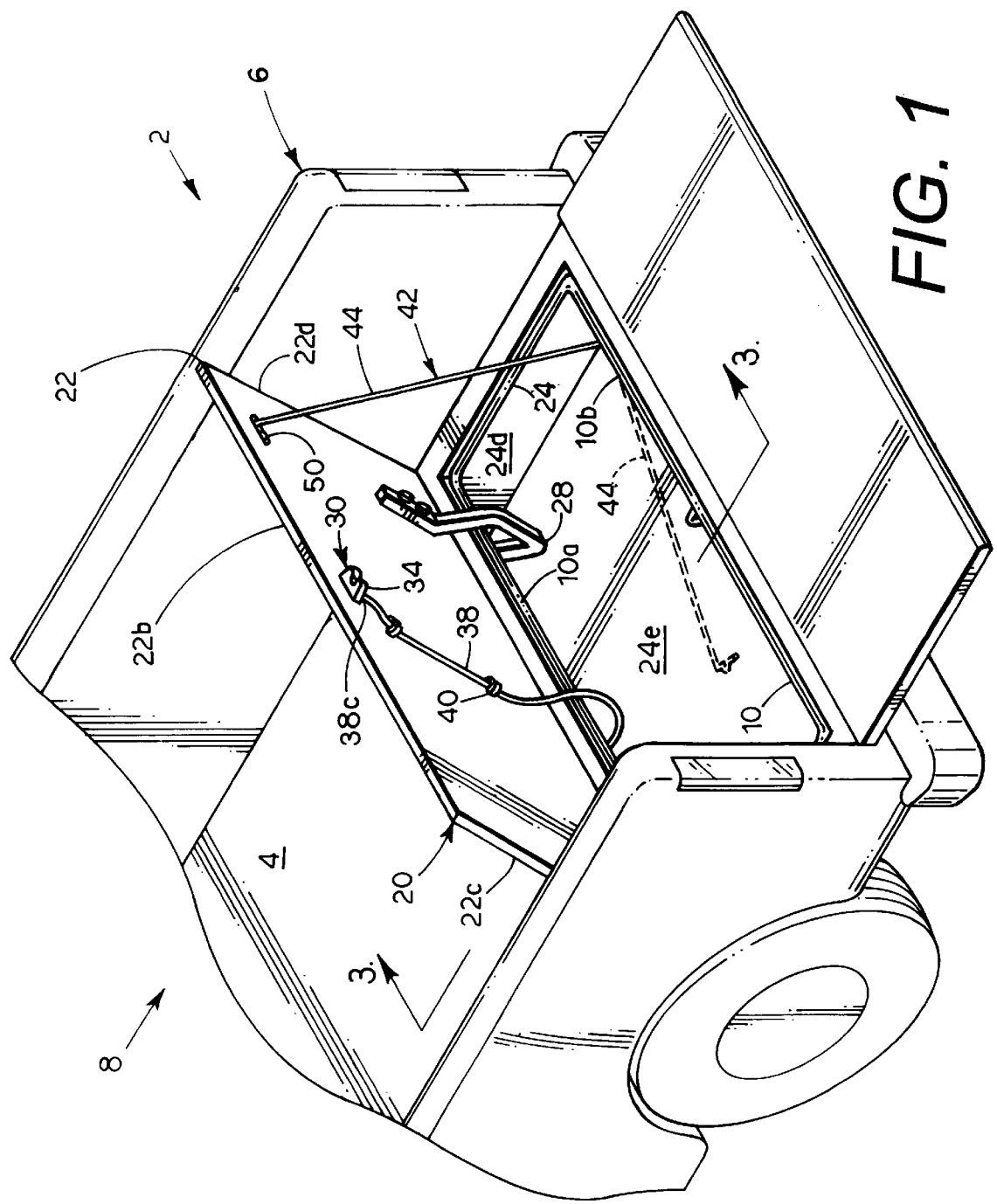
FIG. 1 is a fragmentary, upper, rear, left side perspective view of a pickup truck with a storage system embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally indicates a storage system embodying the present invention. The storage system 2 is adapted for mounting in the floor 4 of a bed 6 of a vehicle 8 such as a pickup truck. However, the storage system 2 could also be adapted to other applications, including different vehicles.

The bed 6 includes a generally rectangular opening 10 with front, back and opposite side edges 10a, 10b, 10c and 10d respectively forming a rim 11. A channel 12 is formed around the rim 11 of the opening 10 and includes a plurality of drain holes 14 and an inner, upwardly-extending flange 16. A gasket 18 is mounted on the inner flange 16 for weather sealing the storage system 2.

A lid assembly 20 includes a lid 22 with front, back, first side and second side edges 22a,b,c and d respectively and upper and lower surfaces 22e,f respectively. A compartment 24 is mounted (e.g., welded) on the truck bed floor 4 beneath the opening 10 and includes front, back and opposite side walls 24a,b,c and d respectively and a compartment floor 24e. The compartment 24 forms a compartment interior 26.

A pair of hinges 28 are mounted on the truck bed floor 4 within the compartment interior 26 in proximity to the compartment front wall 24a. The hinges 28 mount the lid 22 in proximity to its front edge 22a and accommodate movement of the lid 22 between a closed position (FIG. 2) with the gasket 18 sealingly engaging the lid 22 adjacent to its edges 22a–d on the lid lower surface 22f and an open position (FIGS. 1, 3 and 4) providing access to the compartment interior 26 through the truck bed floor opening 10.

A latch assembly 30 includes a catch 32 mounted on the compartment back wall 24b in proximity to the floor opening 10 and a latch 34 engageable with the catch 32 and mounted on the lid lower surface 22f in proximity to the lid back edge 22b. The latch 34 is operable by a keyed lock 36 accessible from the lid upper surface 22e and by an actuator cable 38 mounted on the lid lower surface 22f by mounting clips 40. The cable has a proximate end 38a mounting a knob 38b which can be located at a suitable remote location, such as within the interior of the vehicle 8. A distal end 38c of the cable 38 connects to the latch 34.

Figure 2:
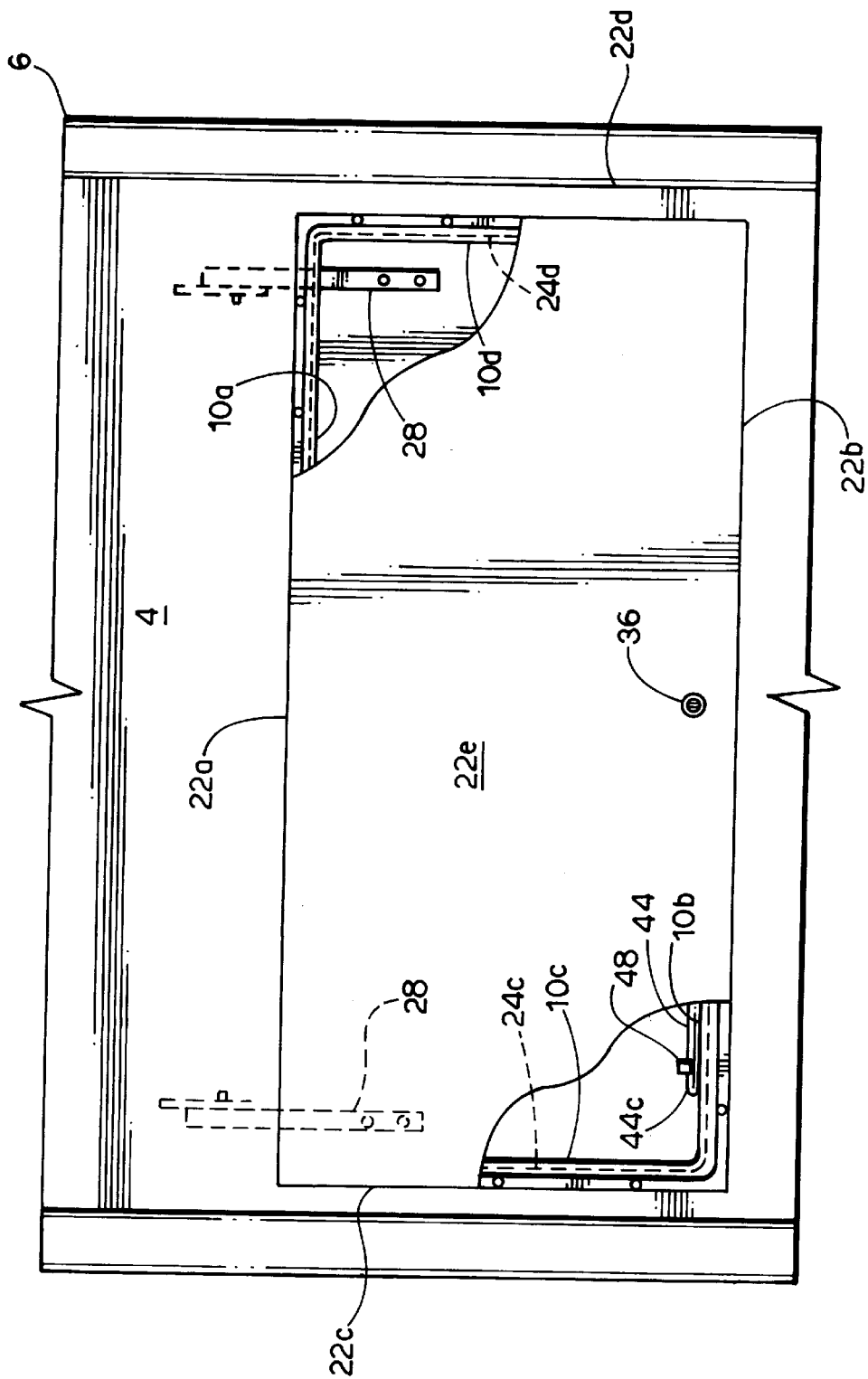
FIG. 2 is a top plan view of the pickup truck bed, particularly showing the storage system.
Figure 3:
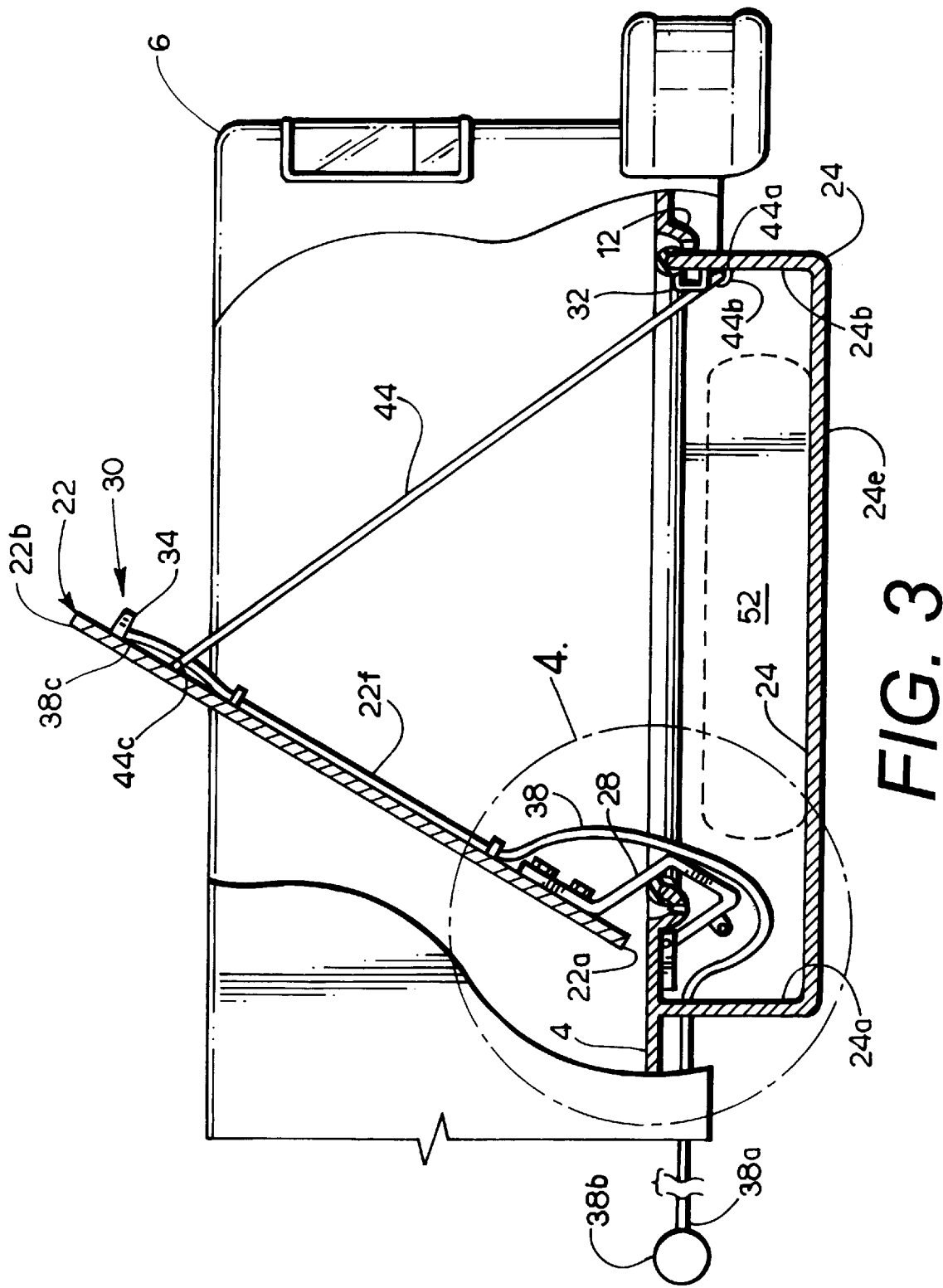
FIG. 3 is a longitudinal cross-section of the storage system, taken generally along line 3—3 in FIG. 1, with a spare tire shown in broken lines therein.
Figure 4:
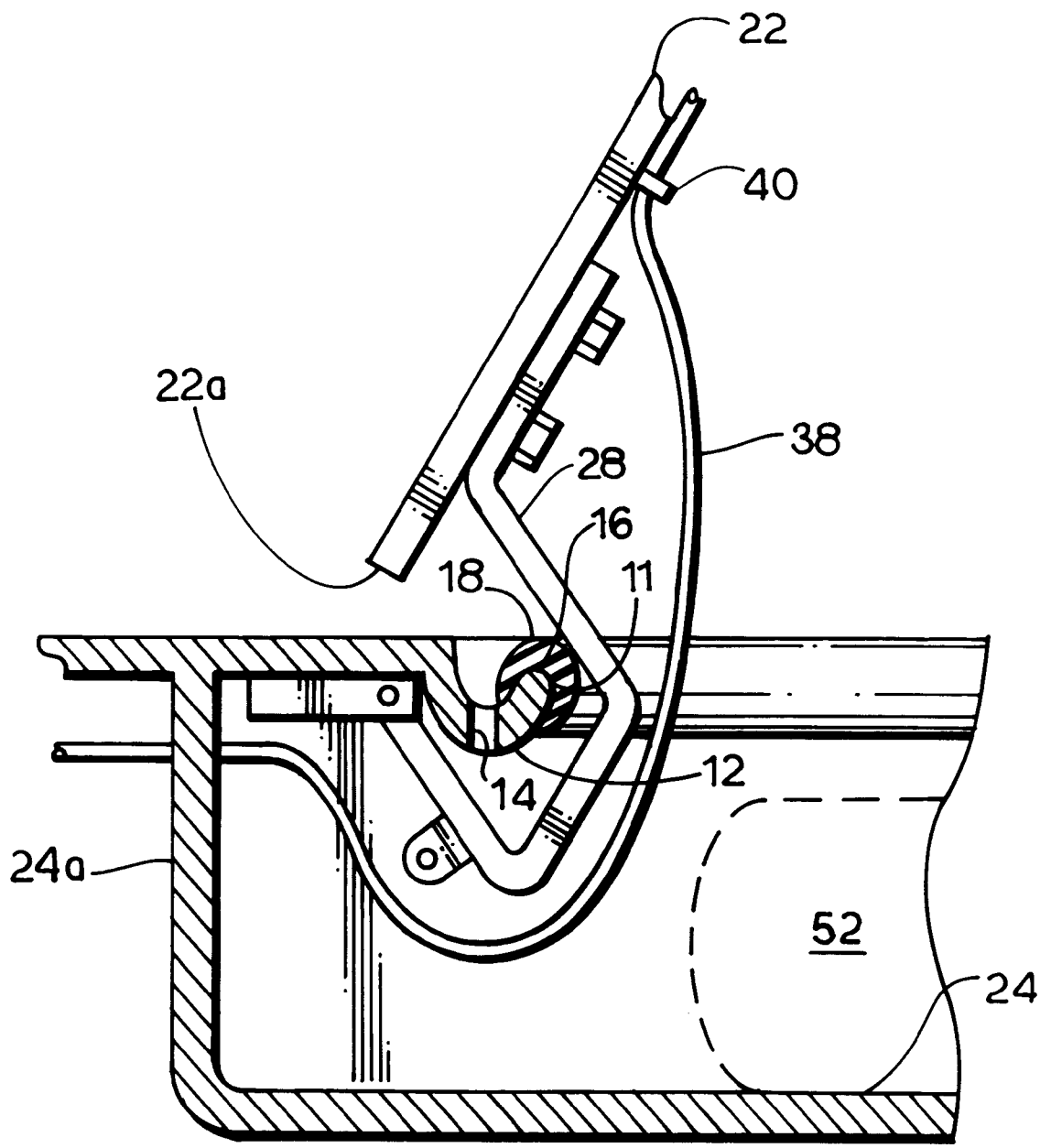
FIG. 4 is an enlarged, fragmentary, cross-sectional view of the storage system taken generally within circle 4 in FIG. 3 and particularly showing the hinged mounting of a lid on the vehicle bed.

A prop rod assembly 42 includes a prop rod 44 with a proximate end 44a mounted on the compartment front wall 24a by a sleeve 44b for pivotal movement between raised and lowered positions (FIGS. 3 and 2 respectively). The prop rod 44 includes a distal end 44c selectively retained by a retainer 48 (FIG. 2) mounted on the compartment back wall 24b and received in a prop rod receiver 50 formed in the lid lower surface 22f.

Figure 3A:
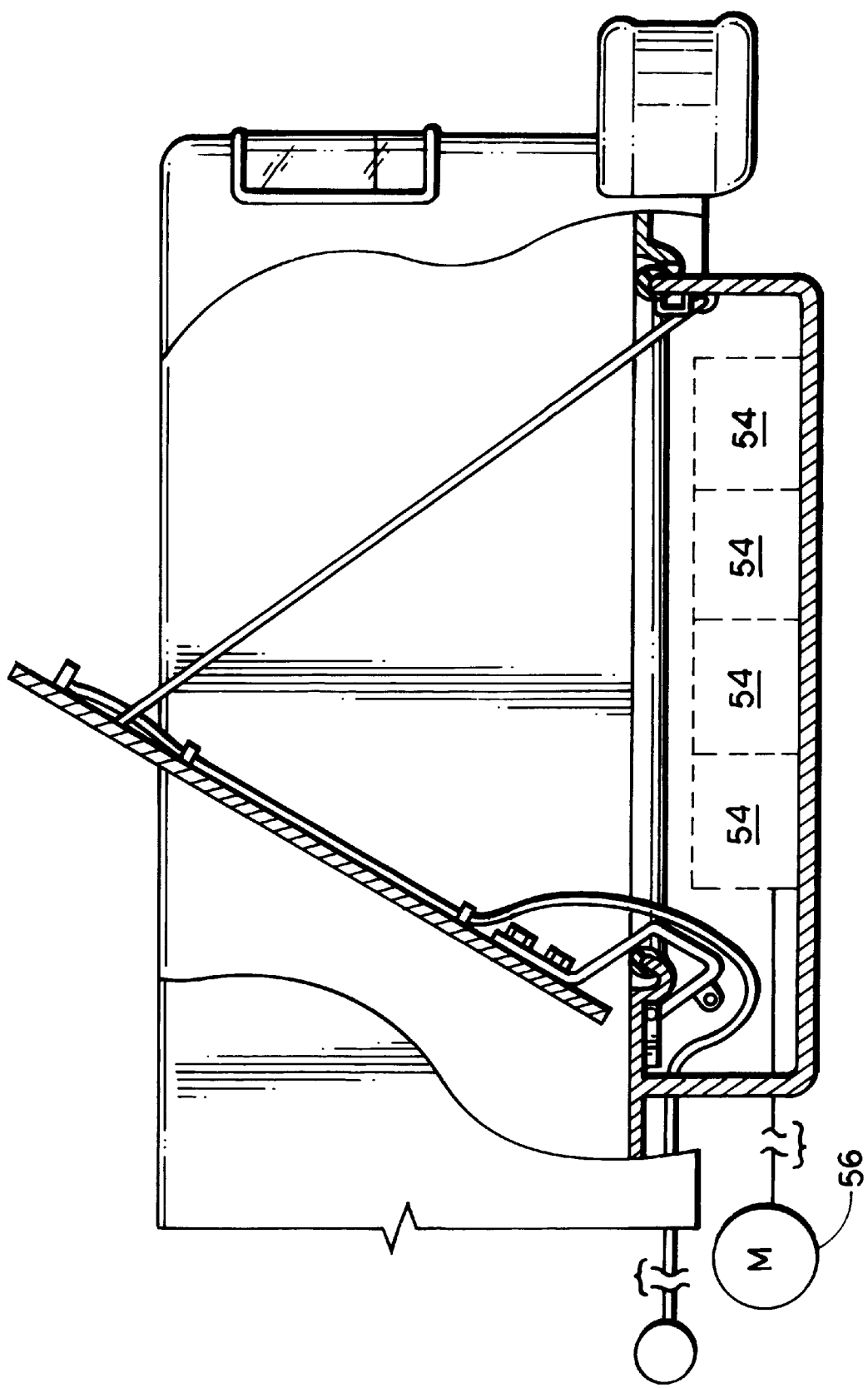
FIG. 3a is a longitudinal cross-section of the storage system with electrical storage batteries shown in broken lines therein.

In operation, the compartment interior 26 is adapted for providing storage for such articles as a spare tire 52 (FIG. 3) or a plurality of storage batteries 54 (FIG. 3a). The electrical storage batteries 54 can be used for electrically powering an electric motor 56 for providing the primary power for the vehicle 8. The compartment interior 26 is adapted for storing a variety of items in secured, protection from the elements without interfering with the normal operation of the vehicle bed 6.

It is to be understood that while certain forms of the present invention have been illustrated and described herein, it is not to be limited to the specific forms or arrangement of parts described and shown.

What is claimed and desired to be secured by Letters Patent is as follows:

1. In combination with a vehicle including a vehicle interior and a bed including a floor, the improvement of a storage system, which includes:
   a) an opening in said vehicle bed floor with an opening rim;
   b) a channel formed at said opening rim and including an inner flange;
   c) a lid assembly including a lid with upper and lower faces, front and back edges and opposite side edges;
   d) a storage compartment having front, back and opposite side walls and a storage compartment floor, said storage compartment having an interior open upwardly through said vehicle bed opening;
   e) a prop rod assembly including a prop rod with a proximate end pivotally mounted in said compartment interior and a distal end selectively connected to said lid adjacent the back edge thereof;
   f) a pair of hinges each mounted on said vehicle bed within said compartment interior in proximity to said compartment front wall and on said lid lower face lid proximity to said lid front edge; and
   g) a latch assembly including:
      1) a catch mounted on said compartment back wall in proximity to said rim;
      2) a latch mounted on said lid lower surface in proximity to said lid back edge;
      3) a lock mechanism connected to said latch and mounted on said lid upper surface; and
      4) an actuating cable including a proximate end positioned in said vehicle interior, a knob mounted on said cable proximate end, and a distal end connected to said latch in said compartment interior.

2. In combination with a vehicle including a vehicle bed, the improvement of a storage system which includes:
   a) an opening formed in the vehicle bed and including an opening rim;
   b) a compartment with an interior;
   c) said compartment being mounted on said bed with said compartment interior accessible through said opening;
   d) a lid assembly including lid mounting means for mounting said lid in covering relation with respect to said opening;
   e) a latch assembly including a latch mounted on said lid and releasably securing said lid in its closed position covering said opening;
   f) said latch assembly including a catch mounted on said compartment within said compartment interior, said catch being adapted to releasably engage said latch; and
   g) said latch assembly having a cable with a proximate end mounting a knob and positioned within an interior of the vehicle and a distal end connected to said latch, said cable being adapted for actuating said latch.

3. The storage system according to claim 2, which includes:
   a) said lid mounting means including a hinge hingedly mounting said lid on said bed in proximity to said rim.

4. The storage system according to claim 2 wherein said latch assembly includes a plurality of mounting clips mounted on said lid and mounting said cable under said lid.

5. The storage system according to claim 2, which includes:
   a) a plurality of electrical storage batteries received in said compartment interior; and
   b) said vehicle having an electric drive motor powered by said batteries.

6. In combination with a vehicle including a vehicle bed, the improvement of a storage system which includes:
   a) an opening formed in the vehicle bed and including an opening rim;
   b) a compartment with an interior;
   c) said compartment being mounted on said bed with said compartment interior accessible through said opening;

d) a lid assembly including lid mounting means for mounting said lid in covering relation with respect to said opening;

e) a channel formed at the rim of said bed opening and including an inner flange;

f) a weathertight gasket mounted on said flange and engaging said lid in its closed position; and g) a plurality of drain holes formed in said channel.

* * * * *